US009720275B2

(12) United States Patent
Yan (10) Patent No.: US 9,720,275 B2
(45) Date of Patent: Aug. 1, 2017

(54) DISPLAY DEVICE, COLOR FILTER AND MANUFACTURING METHOD THEREOF

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventor: Shaning Yan, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 439 days.

(21) Appl. No.: 14/350,479

(22) PCT Filed: Dec. 12, 2013

(86) PCT No.: PCT/CN2013/089283
§ 371 (c)(1),
(2) Date: Apr. 8, 2014

(87) PCT Pub. No.: WO2014/176908
PCT Pub. Date: Nov. 6, 2014

(65) Prior Publication Data
US 2016/0139459 A1    May 19, 2016

(30) Foreign Application Priority Data

Apr. 28, 2013 (CN) .......................... 2013 1 0157258

(51) Int. Cl.
*G02F 1/1335* (2006.01)
*C25D 13/12* (2006.01)
(Continued)

(52) U.S. Cl.
CPC ....... *G02F 1/133516* (2013.01); *C25D 13/02* (2013.01); *C25D 13/12* (2013.01);
(Continued)

(58) Field of Classification Search
None
See application file for complete search history.

(56) References Cited

U.S. PATENT DOCUMENTS 5,420,708 A * 5/1995 Yokoyama ............ G02F 1/1345
349/106
6,068,750 A    5/2000 Rasmussen
(Continued)

FOREIGN PATENT DOCUMENTS

CN    1988169 A    6/2007
CN    101324754 A    12/2008
(Continued)

OTHER PUBLICATIONS

International Search Report mailed Mar. 20, 2014; PCT/CN2013/089283.
(Continued)

*Primary Examiner* — Kishor Mayekar
(74) *Attorney, Agent, or Firm* — Ladas & Parry LLP (57) ABSTRACT

A method of manufacturing a color filter is provided. The method includes: forming at least black matrix electrodes, first electrodes, second electrodes and third electrodes insulated from each other on a base substrate; and depositing at least a black matrix layer, a first color filter pattern, a second color filter pattern and a third color filter patter on the base substrate using an electrophoretic deposition process respectively by means of the black matrix electrodes, the first electrodes, the second electrodes and the third electrodes. A color filter and a display device are also provided. The described solution provides a process which is simple, convenient to operate, ease of control, and allows fast film formation.

16 Claims, 7 Drawing Sheets

(51) Int. Cl.
*G02B 5/20* (2006.01)
*C25D 13/02* (2006.01)
*C25D 13/20* (2006.01)
*C25D 13/22* (2006.01)

(52) U.S. Cl.
CPC ............ *C25D 13/20* (2013.01); *C25D 13/22* (2013.01); *G02B 5/201* (2013.01); *G02F 1/133512* (2013.01)

(56) References Cited

U.S. PATENT DOCUMENTS

| 2007/0138941 | A1 | 6/2007 | Jin et al. |
| 2009/0185113 | A1* | 7/2009 | Chung ............... B82Y 20/00 349/106 |

FOREIGN PATENT DOCUMENTS

| CN | 101728878 A | 6/2010 |
| CN | 103246106 A | 8/2013 |
| JP | 2011-012204 A | 1/2011 |

OTHER PUBLICATIONS

First Chinese Office Action Appln. No. 201310157258.8; dated Apr. 30, 2015.
International Preliminary Report on Patentability issued Nov. 3, 2015: PCT/CN2013/089283.

* cited by examiner

DISPLAY DEVICE, COLOR FILTER AND MANUFACTURING METHOD THEREOF

TECHNICAL FIELD

Embodiments of the present invention relate to a display device, a color filter and a manufacturing method thereof.

BACKGROUND

Thin film transistor-liquid crystal display devices (TFT-LCDs) have been experiencing rapid growth in recent years and have dominated the whole panel display technology. Due to its low cost, high automation production, fast response speed, wide viewing angle, high brightness and ease of realizing full color video image display, it has become one of the most promising display technologies in the $21^{th}$ century. For the current market condition of liquid crystal displays, on-screen system, 3D display and In-Cell technology have become research hotspots. Since a display screen is required to have high picture quality, wider range of color reproduction, faster response time, and low power consumption, it is desired to manufacture color filters with higher quality and better color brightness.

A TFT-LCD realizes display function by constituting a liquid crystal cell with an array substrate and a color filter in which liquid crystal is encapsulated, and by controlling the deflection of the liquid crystal by the array substrate to adjust the transmitting of the light through the color filter, and the color filter determines the quality of the displayed colors.

A conventional color filter includes a substrate on which a black matrix having a color filter pattern in opening areas thereof is disposed. Typically, the color filter pattern may include a first color filter pattern, a second color filter pattern and a third color filter pattern corresponding to one of the three primary colors, red, green and blue respectively, or may further include color filter patterns of other colors such as white and yellow. A planarization layer may be further formed over the black matrix and the color filter pattern, and common electrodes may be further arranged and spacers may be further formed over the planarization layer.

In a conventional manufacturing process of color filters, the manufacturing process for the black matrix and the color filter patterns are substantially the same, i.e., both of them are implemented by patterning with masks. Specifically, a black matrix or color filter pattern with designed pattern is obtained by coating or depositing resins of respective colors on a substrate, exposing them with masks and then developing them. The conventional manufacturing process for color filters needs steps of coating, exposure and development, which is a complex process and is difficult to control.

SUMMARY

Embodiments of the present invention provide a method of manufacturing a color filter, comprising:

step 1, forming at least black matrix electrodes, first electrodes, second electrodes and third electrodes insulated from each other on a base substrate; and step 2, depositing at least a black matrix layer, a first color filter pattern, a second color filter pattern and a third color filter pattern on the base substrate by an electrophoretic deposition respectively by means of the black matrix electrodes, the first electrodes, the second electrodes and the third electrodes.

In an example, the step 1 comprises:

forming a black matrix electrode on the base substrate, opening areas of the black matrix electrode defining at least a first sub-pixel area, a second sub-pixel area and a third sub-pixel area;

forming an insulating layer on a side of the black matrix electrode facing away from the base substrate; and forming the first electrodes, the second electrodes, the third electrodes on a side of the insulating layer facing away from the black matrix electrode, wherein the first electrodes are formed in portions of the side corresponding to the first sub-pixel areas, the second electrodes are formed in portions of the side corresponding to the second sub-pixel areas and the third electrodes are formed in portions of the side corresponding to the third sub-pixel areas.

In an example, the step 2 comprises:

providing an electrophoresis bath filled with a first suspension containing charged black matrix pigment particles;

providing an electrode substrate;

dipping the base substrate that has experienced step 1 and the electrode substrate in the first suspension wherein the black matrix electrodes on the base substrate are arranged oppositely to the electrode substrate; and applying a voltage with opposite polarities onto the black matrix electrodes and the electrode substrate respectively, wherein the voltage applied onto the black matrix electrodes has a polarity opposite to that of charges carried by the black matrix pigment particles, the black matrix pigment particles are deposited on the base substrate in portions corresponding to the black matrix electrodes to form the black matrix layer.

In an example, the method further comprises:

removing the base substrate and cleaning and curing it after depositing the black matrix pigment particles on the base substrate in portions corresponding to the black matrix electrodes to form the black matrix layer.

In an example, the black matrix pigment particles are made of acid black 1, acid black 210 or acid black 234 material.

In an example, the step 2 further comprises:

providing an electrophoresis bath filled with a second suspension containing charged first color pigment particles;

providing an electrode substrate;

dipping the base substrate that has experienced step 1 and the electrode substrate in the second suspension wherein the first electrodes on the base substrate are disposed oppositely to the electrode substrate; and applying a voltage with opposite polarities onto the first electrodes and the electrode substrate respectively, wherein the voltage applied onto the first electrodes has a polarity opposite to that of charges carried by the first color pigment particles, the first color pigment particles are deposited on the first electrodes of the base substrate to form the first color filter pattern.

In an example, the first color pigment particles are made of acid red or metal complex red Red04 material.

In an example, the method further comprises:

removing the base substrate and cleaning and curing it after depositing the first color pigment particles on the first electrodes of the base substrate in the step 2.

In an example, the step 2 further comprises:

providing an electrophoresis bath filled with a third suspension containing charged second color pigment particles;

providing an electrode substrate;

dipping the base substrate that has experienced step 1 and the electrode substrate in the third suspension, wherein the second electrodes on the base substrate are disposed oppositely to the electrode substrate; and applying a voltage with opposite polarities onto the second electrodes and the electrode substrate respectively, wherein the voltage applied onto the second electrodes has a polarity opposite to that of charges carried by the second color pigment particles, the second color pigment particles are deposited on the second electrodes of the base substrate to form the second color filter pattern.

In an example, the second color pigment particles are made of metal complex green GN-20 material.

In an example, the method further comprises:

removing the base substrate and cleaning and curing it after depositing the second color pigment particles on the second electrodes of the base substrate in the step 2.

In an example, the step 2 further comprises:

providing an electrophoresis bath filled with a fourth suspension containing charged third color pigment particles;

providing an electrode substrate;

dipping the base substrate that has experienced step 1 and the electrode substrate in the fourth suspension wherein the third electrodes on the base substrate are disposed oppositely to the electrode substrate; and applying a voltage with opposite polarities onto the third electrodes and the electrode substrate respectively, wherein the voltage applied onto the third electrodes has a polarity opposite to that of charges carried by the third color pigment particles, the third color pigment particles are deposited on the third electrodes of the base substrate to form the third color filter pattern.

In an example, the third color pigment particles are made of metal complex blue BL-03 material.

In an example, the method further comprises:

removing the base substrate and cleaning and curing it after depositing the third color pigment particles on the third electrodes of the base substrate in the step 2.

Another embodiment of the present invention provides a color filter comprising:

a base substrate;

black matrix electrodes, first electrodes, second electrodes and third electrodes insulated from each other formed on the base substrate;

a black matrix layer formed on the base substrate in portions corresponding to the black matrix electrodes;

a first color filter pattern formed on the base substrate in portions corresponding to the first electrodes;

a second color filter pattern formed on the base substrate in portions corresponding to the second electrodes; and a third color filter pattern formed on the base substrate in portions corresponding to the third electrodes.

In an example, opening areas of the black matrix electrodes are formed with at least first sub-pixel areas, second sub-pixel areas and third sub-pixel areas; and an insulating layer is further formed on the base substrate which covers a side of the black matrix electrodes facing away from the base substrate;

the first electrodes are formed on a side of the insulating layer facing away from the black matrix electrodes and correspond to the first sub-pixel areas;

the second electrodes are formed on a side of the insulating layer facing away from the black matrix electrodes and correspond to the second sub-pixel areas; and the third electrodes are formed on a side of the insulating layer facing away from the black matrix electrodes and correspond to the third sub-pixel areas.

In an example, the black matrix layer is formed on a side of the insulating layer facing away from the black matrix electrodes and corresponds to the locations of the black matrix electrodes;

the first color filter pattern is formed on a side of the first electrodes facing away from the insulating layer and corresponds to the locations of the first electrodes;

the second color filter pattern is formed on a side of the second electrodes facing away from the insulating layer and corresponds to the locations of the second electrodes; and the third color filter pattern is formed on a side of the third electrodes facing away from the insulating layer and corresponds to the locations of the third electrodes.

The present invention further provides a display device comprising any of the above described color filters.

BRIEF DESCRIPTION OF THE DRAWINGS

Embodiments of the present invention will be described in more detail below with reference to the accompanying drawings to allow one of ordinary skill in the art to understand the present invention more clearly, and wherein.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is apparent that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second" or the like, which are used in the description and the claims of the present application, are not intended to indicate any sequence, amount or importance, but for distinguishing various components. Also, the terms, such as "a/an," "one," "the/the" or the like, are not intended to limit the amount, but for indicating the existence of at lease one. The terms, such as "comprise/comprising." "include/including" or the like, are intended to specify that the elements or the objects stated before these terms encompass the elements or the objects and equivalents thereof listed after these terms, but not preclude other elements or objects. The terms, such as "On," "under," or the like, are only used to indicate relative position relationship, and when the position of the object which is described is changed, the relative position relationship may be changed accordingly.

In view of the problems of complex manufacturing process and difficult control over process in manufacturing color filters with exposure and development in prior art, embodiments of the present invention provide a manufacturing method of color filters in which the black matrix layer and red, green and blue sub-pixels of the color filter are formed by depositing pigment particles with electrophoretic deposition. This method has advantages of simple process, convenient operation, fast film formation and ease of process control.

The electrophoretic deposition is a method of forming agglutinated deposition by means of charged particles in a suspension moving towards one end of an electrode under the action of external electric field and aggregating together.

The method of manufacturing a color filter provided in an embodiment of the present invention comprises steps of:

step 1, forming at least black matrix electrodes, first electrodes, second electrodes and third electrodes insulated from each other on a base substrate; and step 2, depositing at least a black matrix layer, a first color filter pattern, a second color filter pattern and a third color filter pattern on the base substrate by an electrophoretic deposition respectively by means of the black matrix electrodes, the first electrodes, the second electrodes and the third electrodes.

According to an embodiment, the black matrix layer is deposited on parts corresponding to the black matrix electrodes, the first color filter pattern is deposited on parts corresponding to the first electrodes, the second color filter pattern is deposited on parts corresponding to the second electrodes, and the third color filter pattern is deposited on parts corresponding to the third electrodes.

In the above described solution, the electrophoretic deposition process is used to manufacture the black matrix layer, the first color filter pattern, the second color filter pattern and the third color filter pattern in the color filter so as to obtain a color filter, which features simple process, convenient operation, fast film formation and ease of process control.

It is to be noted that the color filter pattern generally may include a first color filter pattern, a second color filter pattern and a third color filter pattern corresponding to one of the three primary colors, red, green and blue respectively, and may further include color filter patterns of other colors such as white and yellow, and the present invention is not limited thereto. Accordingly, since different color filter patterns are formed on parts corresponding to different electrodes on the base substrate, the base substrate may further include other electrodes, and the present invention is not limited thereto.

Figure 1:
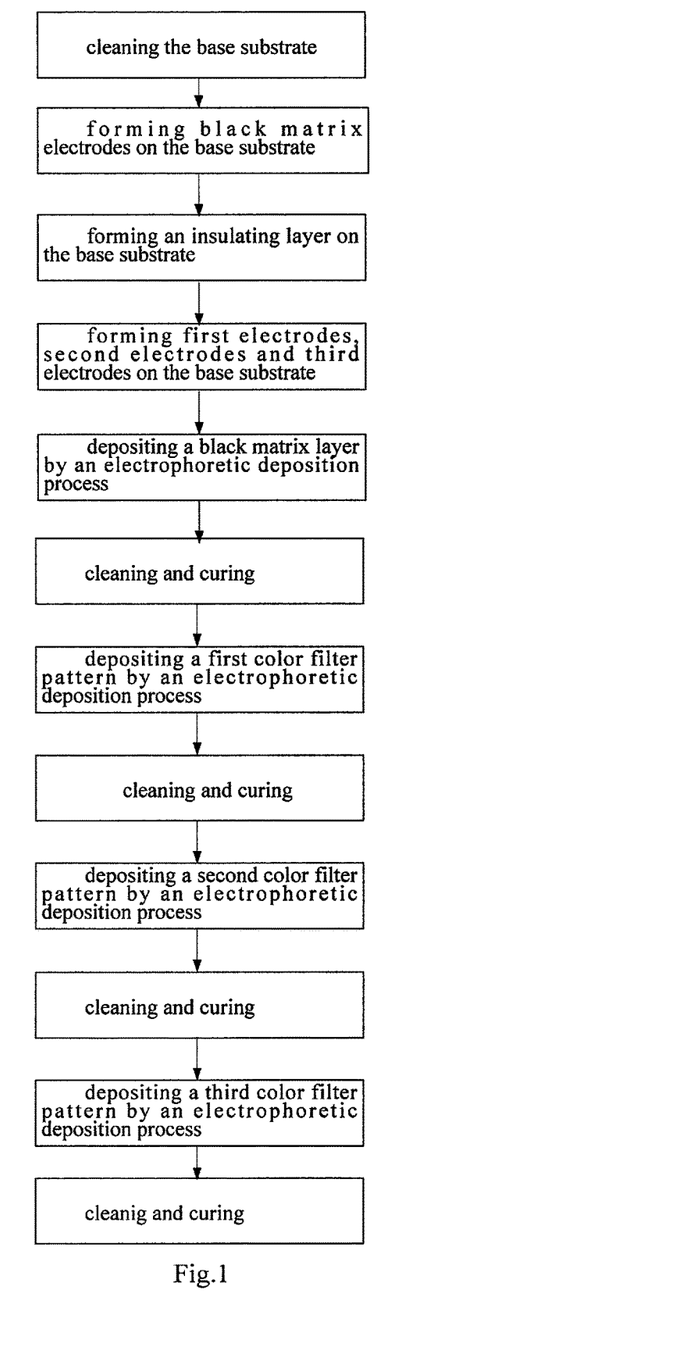
FIG. 1 shows a flowchart of a method of manufacturing a color filter provided in an embodiment of the present invention.

FIG. 1 shows a flowchart of an embodiment of a manufacturing method of a color filter provided in an embodiment of the present invention.

Figure 2:
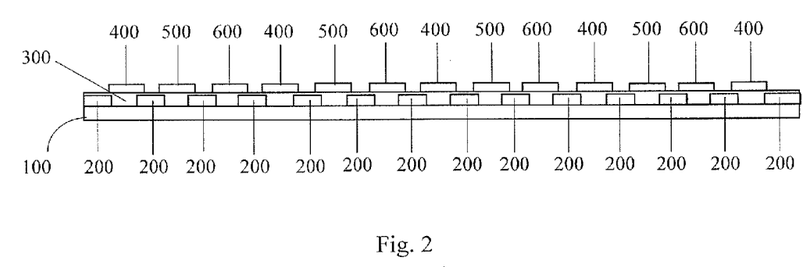
FIG. 2 shows a structural schematic view of the base substrate obtained by step 1 with a black matrix layer, a first electrode layer, a second electrode layer and a third electrode layer.

FIG. 2 shows a structural schematic view of the base substrate obtained by step 1 with a black matrix layer, a first electrode layer, a second electrode layer and a third electrode layer. As shown in FIGS. 1 and 2, according to the embodiment of the present invention, step 1 of the method of manufacturing a color filter further comprises:

cleaning the base substrate 100;

forming a black matrix electrode 200 on the base substrate 100, wherein the black matrix electrode 200 has opening areas at least defining first sub-pixel areas, second sub-pixel areas and third sub-pixel areas;

forming an insulating layer 300 over a side of the black matrix electrode 200 facing away from the base substrate 100;

forming the first electrodes 400 on a side of the insulating layer 300 facing away from the black matrix electrode 200 in portions corresponding to the first sub-pixel areas;

forming the second electrodes 500 on a side of the insulating layer 300 facing away from the black matrix electrode 200 in portions corresponding to the second sub-pixel areas;

forming the third electrodes 600 on a side of the insulating layer 300 facing away from the black matrix electrode 200 in portions corresponding to the third sub-pixel areas. The structure of the base substrate 100 obtained by step 1 is shown in FIG. 2.

The black matrix electrodes 200, the first electrodes 400, the second electrodes 500 and the third electrodes 600 may all be formed of transparent electrodes. And the base substrate 100 may be made of glass, quartz or transparent plastics.

Furthermore, it is to be noted that the color filter pattern generally may include a first color filter pattern, a second color filter pattern and a third color filter pattern corresponding to one of the three primary colors, red, green and blue respectively, or may further include color filter patterns of other colors, such as white and yellow, and the present invention is not limited thereto. Accordingly, since color filter patterns of different colors correspond to different sub-pixel areas, the opening areas of the black matrix electrodes 200 may further define other sub-pixel areas, and the present invention is not limited thereto either.

After the above described step 1 is carried out, namely, the black matrix electrodes 200, the first electrodes 400, the second electrodes 500 and the third electrodes 600 are formed on the base substrate 100, step 2 is carried out, that is, at least a black matrix layer, a first color filter pattern, a second color filter pattern and a third color filter pattern are deposited by using the electrophoretic deposition process on the base substrate 100.

Figure 3:
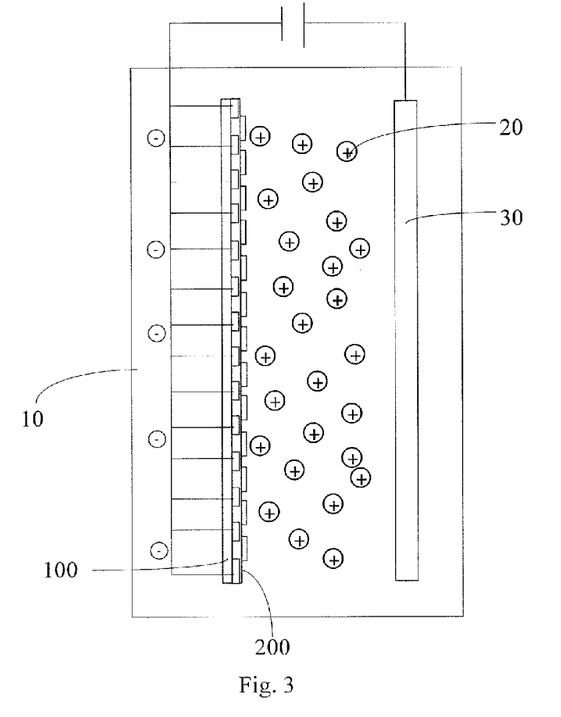
FIG. 3 shows a process diagram of forming a black matrix layer by deposition using electrophoretic deposition process on the base substrate.

In step 2, a black matrix layer is firstly formed by deposition using the electrophoretic deposition process. FIG. 3 shows a schematic diagram of depositing a black matrix layer by using the electrophoretic deposition process on the base substrate. As shown in FIG. 3, for example, the black matrix layer is formed on the base substrate 100 using the electrophoretic deposition process by:

providing an electrophoresis bath 10 filled with a first suspension containing charged black matrix pigment particles 20;

providing an electrode substrate 30;

dipping the base substrate 100 and the electrode substrate 30 obtained in step 1 in the first suspension as shown in FIG.

3, such that the black matrix electrodes 200 on the base substrate 100 are disposed oppositely to the electrode substrate 30; and applying a voltage with opposite polarities onto the black matrix electrodes 200 and the electrode substrate 30 respectively, wherein the voltage applied to the black matrix electrodes 200 has a polarity opposite to that of the charges carried by the black matrix pigment particles 20 (FIG. 3 only shows the case in which black matrix pigment particles 20 are positively charged while the black matrix electrodes 200 are applied with cathode voltage); under the action of the electric field formed between the black matrix electrodes 200 and the electrode substrate 30, the black matrix pigment particles 20 move towards the black matrix electrodes 200 and aggregate and deposit on the insulating layer 300 of the base substrate 100 in portions corresponding to the black matrix electrodes 200 so as to form the black matrix layer.

For example, the thickness of the deposits of black matrix pigment particles 20 can be controlled by controlling the magnitude of the electric field and the deposition time. And after the deposition of the black matrix pigment particles 20 is completed, the base substrate 100 with the deposits is removed.

For example, the base substrate 100 with the deposits is cleaned and cured to obtain the base substrate 100 with the black matrix layer.

It is to be noted that the charges carried by the black matrix pigment particles 20 may be positive or negative in the above described solution. Accordingly, the voltage applied on the black matrix electrodes 200 has an opposite polarity to that of the charges carried by the black matrix pigment particles 20, and it is not limited to the charges carried by the black matrix pigment particles 20 here.

Furthermore, the black matrix pigment particles 20 may be made of acid black 1, acid black 210 or acid black 234 material, for example. The first suspension may be a mixed solution of pyridine or phenylamine and alcohol, for example. Adding material of acid black 1, acid black 210 or acid black 234 into the mixed solution of pyridine or phenylamine and alcohol can obtain the charged black matrix pigment particles 20. In practical applications, the black matrix pigment particles 20 and the first suspension may also be implemented by other materials.

Figure 4:
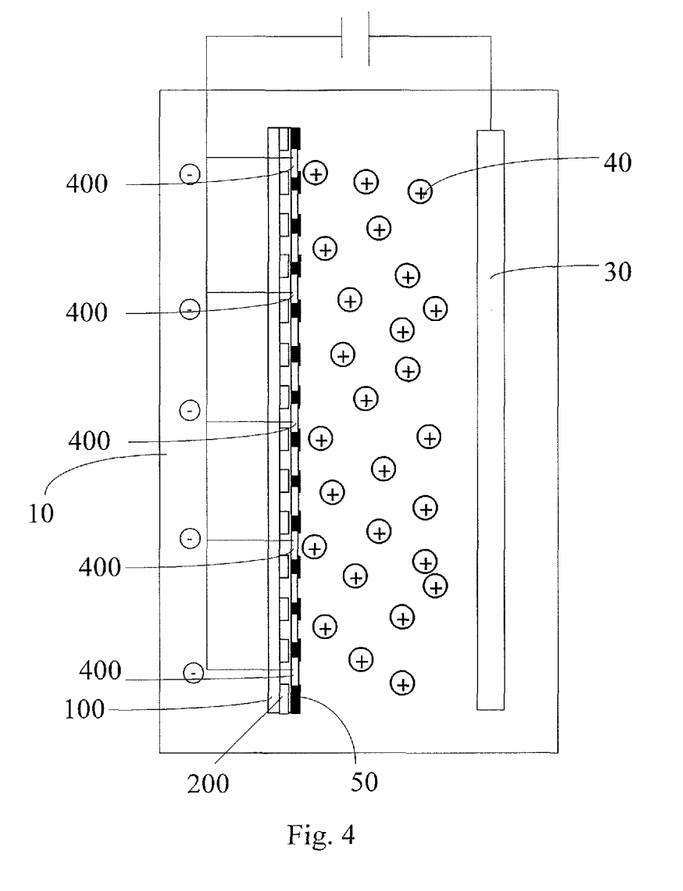
FIG. 4 shows a process diagram of forming a first color filter pattern by deposition using electrophoretic deposition process on the base substrate.

In step 2, after the black matrix layer is formed, the first color filter pattern is deposited on the base substrate 100 with black matrix layer by using the electrophoretic deposition process. FIG. 4 is a schematic diagram of depositing the first color filter pattern on the base substrate by using the electrophoretic deposition process. As shown in FIG. 4, for example, the first color filter pattern may be formed on the base substrate 100 using the electrophoretic deposition by:

providing an electrophoresis bath 10 filled with a second suspension containing the charged first color pigment particles 40;

providing an electrode substrate 30;

dipping the base substrate 100 with black matrix layer 50 and the electrode substrate 30 in the second suspension wherein first electrodes 400 on the base substrate 100 are disposed oppositely to the electrode substrate 30; and applying a voltage with opposite polarities onto the first electrodes 400 and the electrode substrate 30 respectively, wherein the voltage applied onto the first electrodes 400 has opposite polarity to that of the charges carried by the first color pigment particles 40 (FIG. 4 only shows the case in which the first color pigment particles 40 carry positive charges and the first electrodes 400 are applied with cathode voltage), under the action of the electric field formed between the first electrodes 400 and the electrode substrate 30, the first color pigment particles 40 move towards the first electrodes 400 and aggregate and deposit on the first electrodes 400 of the base substrate 100, to form the first color filter pattern 70.

The thickness of the deposits of the first color pigment particles 40 can be controlled by controlling the magnitude of the electric field and the deposition time. And after the deposition of the first color pigment particles 40 is completed, the base substrate 100 with the deposits is removed.

For example, the base substrate 100 with the deposits is cleaned and cured to obtain the base substrate 100 with the black matrix layer 50 and the first color filter pattern 70.

Figure 5:
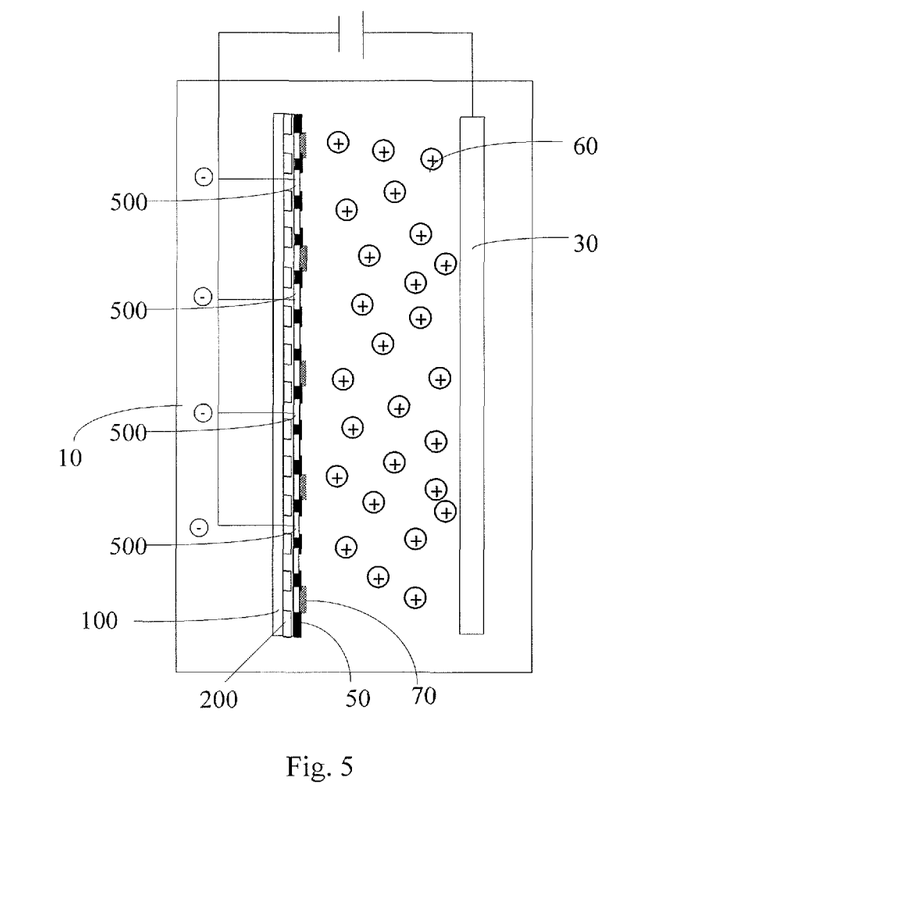
FIG. 5 shows a process diagram of forming a second color filter pattern by deposition using electrophoretic deposition process on the base substrate.

In step 2, after the first color filter pattern is formed, the second color filter pattern 90 on the base substrate 100 with black matrix layer and the first color filter pattern 70 are deposited by using the electrophoretic deposition process. FIG. 5 is a schematic diagram of depositing the second color filter pattern 90 on the base substrate by using electrophoretic deposition process. As shown in FIG. 5, for example, the second color filter pattern 90 may be formed on the base substrate 100 using the electrophoretic deposition process by:

providing an electrophoresis bath 10 filled with a third suspension containing the charged third color pigment particles 60;

providing an electrode substrate 30;

dipping the base substrate 100 with the black matrix layer 50 and the first color filter pattern 70 and the electrode substrate 30 in the third suspension, wherein the second electrodes 500 on the base substrate 100 are disposed oppositely to the electrode substrate 30; and applying a voltage with opposite polarities onto the second electrodes 500 and the electrode substrate 30 respectively, wherein the voltage applied onto the second electrodes 500 has opposite polarity to that of the charges carried by the second color pigment particles 60 (FIG. 5 only shows the case in which the second color pigment particles 60 carry positive charges and the second electrodes 500 are applied with cathode voltage), under the action of the electric field formed between the second electrodes 500 and the electrode substrate 30, the second color pigment particles 60 move towards the second electrodes 500 and aggregate and deposit on the second electrodes 500 of the base substrate 100, to form the second color filter pattern.

The thickness of the deposition of the second color pigment particles 60 can be controlled by controlling the magnitude of electric field and deposition time. And after the deposition of the second color pigment particles 60 is completed, the base substrate 100 with the deposition is removed.

For example, the base substrate 100 with the deposits is cleaned and cured to obtain the base substrate 100 with the black matrix layer 50, the first color filter pattern 70 and the second color filter pattern 90.

Figure 6:
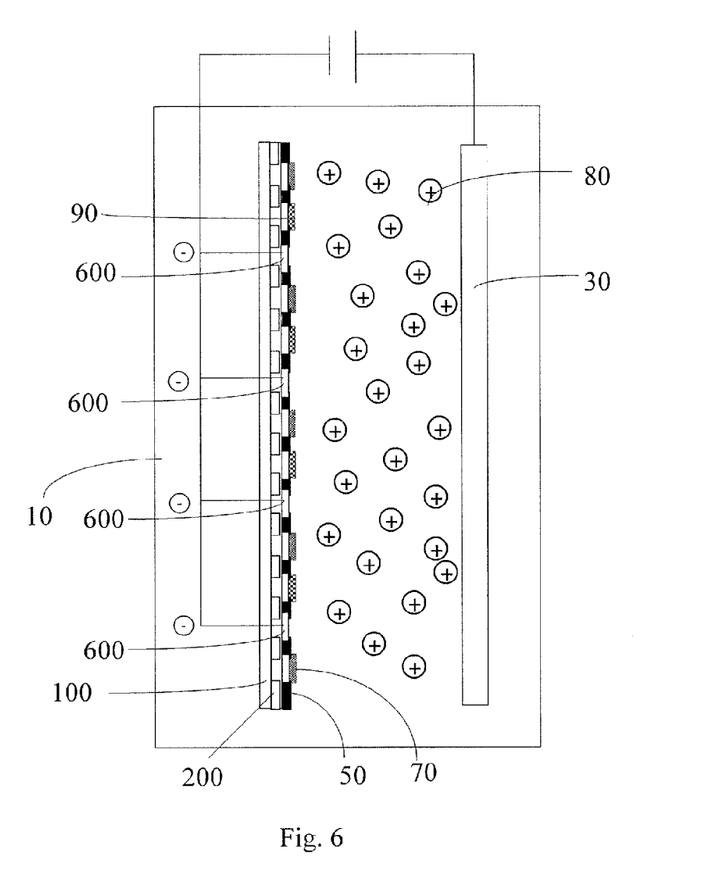
FIG. 6 shows a process diagram of forming a third color filter pattern by deposition using electrophoretic deposition process on the base substrate.

In step 2, after the black matrix layer, the first color filter pattern and the second color filter pattern are formed, the third color filter pattern on the base substrate 100 with black matrix layer, the first color filter pattern and the second color filter pattern is deposited by using the electrophoretic deposition process. FIG. 6 is a schematic diagram of depositing the third color filter pattern on the base substrate by using the electrophoretic deposition process. As shown in FIG. 6, for example, the third color filter pattern may be formed on the base substrate 100 using the electrophoretic deposition process by:

providing an electrophoresis bath 10 filled with a fourth suspension containing the charged third color pigment particles 80;

providing an electrode substrate 30;

dipping the base substrate 100 with the black matrix layer 50, the first color filter pattern 70 and the second color filter pattern 90 and the electrode substrate 30 in the fourth suspension, wherein the third electrodes 600 on the base substrate 100 are disposed oppositely to the electrode substrate 30; and applying a voltage with opposite polarities onto the third electrodes 600 and the electrode substrate 30 respectively, wherein the voltage applied onto the third electrodes 600 has opposite polarity to that of the charges carried by the third color pigment particles 80 (FIG. 6 only shows the case in which the third color pigment particles 80 carry positive charges and the third electrodes 600 are applied with cathode voltage), under the action of the electric field formed between the third electrodes 600 and the electrode substrate 30, the third color pigment particles 80 move towards the third electrodes 600 and aggregate and deposit on the third electrodes 600 of the base substrate 100, so as to form the third color filter pattern.

The thickness of the deposits of the third color pigment particles 80 can be controlled by controlling the magnitude of the electric field and the deposition time. And after the deposition of the third color pigment particles 80 is completed, the base substrate 100 with the deposition is removed.

Figure 8:
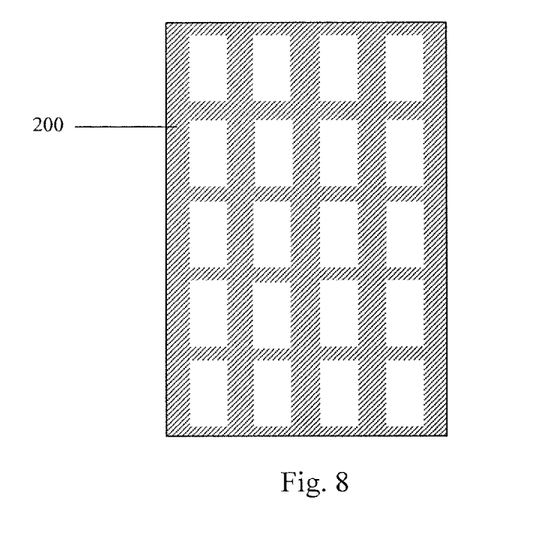
FIG. 8 is a structural schematic view of the black matrix electrodes 200.

For example, the base substrate 100 with deposition is cleaned and cured to obtain the color filter with the black matrix layer 50, the first color filter pattern 70, the second color filter pattern 90 and the third color filter pattern 110 as shown in FIG. 8, and the manufacturing of the color filter is completed.

It is to be noted that the above described first color filter pattern 70, the second color filter pattern 90 and the third color filter pattern 110 correspond to one of the three primary colors, i.e., red, green and blue respectively. However, it is to be understood that the above described manufacturing order for the black matrix layer, the first color filter pattern, the second color filter pattern and the third color filter pattern is only for illustrative explanation, and it may be adjusted according to production requirements or design requirements in practice, which is not limited herein.

The first color pigment particles 40 may be made of a material of acid red or metal complex red Red04, and the second suspension may be prepared by mixed solution of pyridine or phenylamine and alcohol, for example. The charged first color pigment particles 40 is obtained by adding the acid red or metal complex red Red04 into the mixed solution of pyridine or phenylamine and alcohol. In practical applications, the first color pigment particles 40 and the second suspension may also be implemented by other materials as required.

The second color pigment particles 60 may be made of metal complex green GN-20 material, and the third suspension may be prepared by mixed solution of pyridine or phenylamine and alcohol, for example. The charged second color pigment particles 60 is obtained by adding the metal complex green GN-20 into the mixed solution of pyridine or phenylamine and ethanol. In practical applications, the second color pigment particles 60 and the third suspension may also be implemented with other materials as required.

The third color pigment particles 80 may be made of metal complex blue BL-03 material, for example. And the fourth suspension may be prepared by mixed solution of pyridine or phenylamine and alcohol, for example. The charged third color pigment particles 80 is obtained by adding the metal complex blue BL-03 into the mixed solution of pyridine or phenylamine and ethanol. In practical applications, the third color pigment particles 80 and the fourth suspension may also be implemented by other materials as required.

Figure 9:
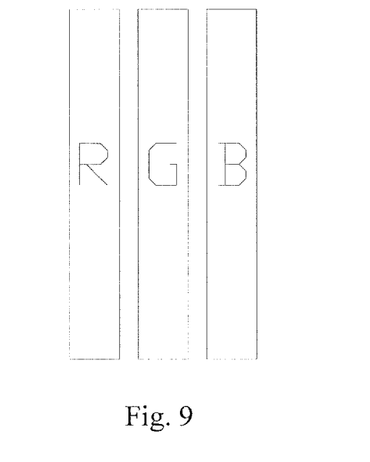
FIG. 9 shows an arrangement of the first electrodes, the second electrodes and the third electrodes of a Stripe type color filter.
Figure 10:
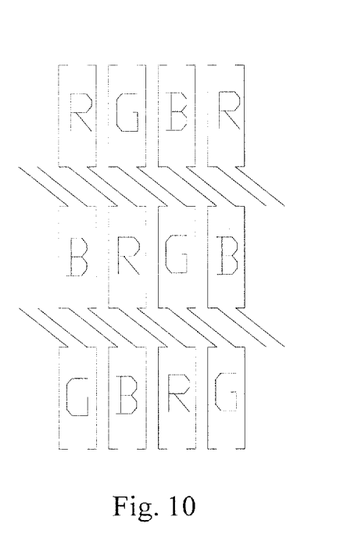
FIG. 10 shows an arrangement of the first electrodes, the second electrodes and the third electrodes of a Mosaic type color filter.
Figure 11:
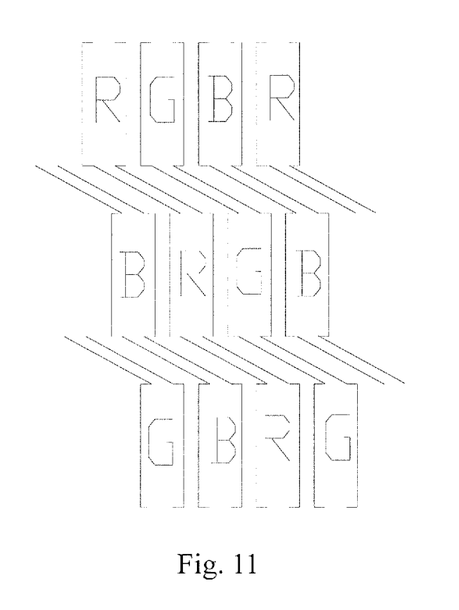
FIG. 11 shows an arrangement of the first electrodes, the second electrodes and the third electrodes of a Delta type color filter.

In the above described method of manufacturing a color filter provided in embodiments of the present invention, the manufacture is carried out in solution. Compared with the conventional patterning process, there is less material wasted, and nearly no wastes produced in the manufacturing process; the equipments used are simple and convenient to operate; and the film formation is fast, as well as the deposition process is easy to control and the film thickness is easy to be controlled by controlling the strength of the deposition electric field and the deposition time. Furthermore, it is possible to manufacture color filters with various arrangements by controlling the shapes and structures of the black matrix electrodes 200, the first electrodes 400, the second electrodes 500 and the third electrodes 600, and it is applicable to manufacturing various color filters. For example, FIG. 9 shows an arrangement of the first electrodes, the second electrodes and the third electrodes of a Stripe type color filter. FIG. 10 shows an arrangement of the first electrodes, the second electrodes and the third electrodes of a Mosaic type color filter. FIG. 11 shows an arrangement of the first electrodes, the second electrodes and the third electrodes of a Delta type color filter.

Furthermore, it is to be noted that, the method of manufacturing color filters provided in embodiments of the present invention is particularly suitable for color filters of TN (Twisted Nematic) panels.

Figure 7:
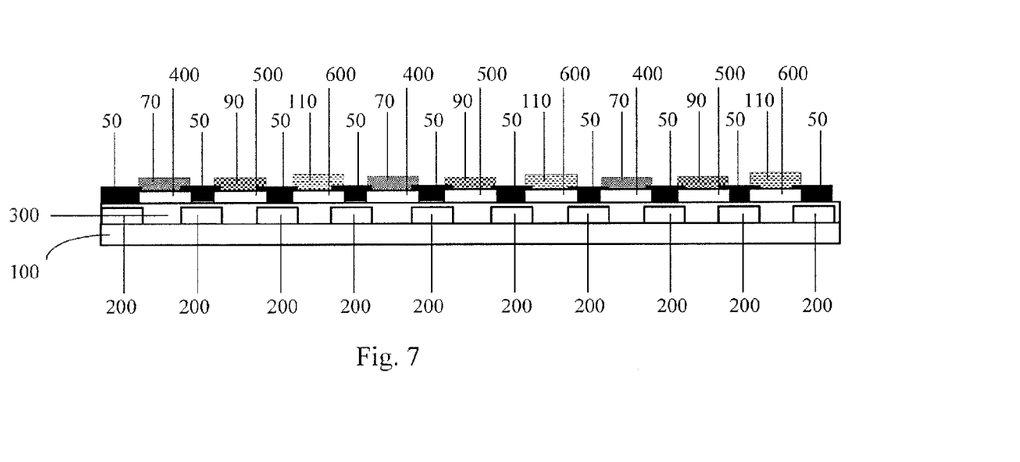
FIG. 7 shows a structural schematic view of a color filter manufactured by a method provided in an embodiment of the present invention.

Furthermore, embodiments of the present invention further provide a color filter that can be manufactured with the above described method. As shown in FIG. 7, the color filter comprises:

a base substrate 100;

black matrix electrodes 200, first electrodes 400, second electrodes 500 and third electrodes 600 insulated from each other formed on the base substrate 100;

a black matrix layer 50 formed on the base substrate 100 in portions corresponding to the black matrix electrode 200;

a first color filter pattern 70 formed on the base substrate 100 in portions corresponding to the first electrodes 400;

a second color filter pattern 90 formed on the base substrate 100 in portions corresponding to the second electrodes 500; and a third color filter pattern 110 formed on the base substrate 100 in portions corresponding to the third electrodes 600.

In this embodiment, for example, as shown in FIG. 9, the opening areas of the black matrix electrodes 200 are formed with at least the first sub-pixel areas, the second sub-pixel areas and the third sub-pixel areas.

An insulating layer 300 is further formed on the base substrate 100, which covers a side of the black matrix electrode 200 facing away from the base substrate 100.

The first electrodes 400 are formed on a side of the insulating layer 300 facing away from the black matrix electrode 200 and correspond to the first sub-pixel areas.

The second electrodes 500 are formed on a side of the insulating layer 300 facing away from the black matrix electrodes 200 and correspond to the second sub-pixel areas.

The third electrodes 600 are formed on a side of the insulating layer 300 facing away from the black matrix electrodes 200 and correspond to the third sub-pixel areas.

For example, the black matrix layer 50 is formed on a side of the insulating layer 300 facing away from the black matrix electrodes 200 and corresponds to the locations of the black matrix electrodes 200.

The first color filter pattern 70 is formed on a side of the first electrodes 400 facing away from the insulating layer 300 and corresponds to the locations of the first electrodes 400.

The second color filter pattern 90 is formed on a side of the second electrodes 500 facing away from the insulating layer 300 and corresponds to the locations of the second electrodes 500.

The third color filter pattern 110 is formed on a side of the third electrodes 600 facing away from the insulating layer 300 and corresponds to the locations of the third electrodes 600.

In the above described technical solution, the color filter is manufactured by using the electrophoretic deposition process, and the manufacturing procedure is carried out in a solution. Compared with the conventional patterning process, there is less material wasted, and nearly no wastes produced in the manufacturing process; the equipments used are simple and convenient to operate; and the film formation is fast, as well as the deposition process is easy to control and the film thickness is easy to be controlled by controlling the strength of the deposition electric field and the deposition time. Furthermore, it is applicable to manufacturing various color filters.

In addition, embodiments of the present invention further provide a display device comprising any one of the color filters as described above. The display device may be any product or component with display function, such as a liquid crystal panel, a cellphone, a tablet computer, a TV set, a display, a notebook computer, a digital picture frame or a navigator.

It is understood that the described above are only illustrative embodiments and implementations for explaining the principle of the present invention, and the present invention is not intended to limited thereto. For one of ordinary skill in the art, various modifications and improvements may be made without departing from the spirit and gist of embodiments of the present invention, and all of which should fall within the protection scope of the present invention.

What is claimed is:

1. A method of manufacturing a color filter, comprising:
    step 1, at least forming black matrix electrodes, first electrodes, second electrodes and third electrodes insulated from each other on a base substrate; and
    step 2, at least forming a black matrix layer, a first color filter pattern, a second color filter pattern and a third color filter pattern on the base substrate using an electrophoretic deposition process respectively by the black matrix electrodes, the first electrodes, the second electrodes and the third electrodes; wherein the step 1 comprises:
    forming the black matrix electrodes with a plurality of opening areas on the base substrate, the plurality of opening areas of the black matrix electrodes defining at least a first sub-pixel area, a second sub-pixel area and a third sub-pixel area;
    forming an insulating layer on a side of the black matrix electrode facing away from the base substrate; and
    forming the first electrodes, the second electrodes and the third electrodes on a side of the insulating layer facing away from the black matrix electrodes, wherein the first electrodes are formed in portions of the side corresponding to the first sub-pixel areas, the second electrodes are formed in portions corresponding to the second sub-pixel areas and the third electrodes are formed in portions corresponding to the third sub-pixel areas.

2. The method of manufacturing a color filter according to claim 1, wherein
    the step 2 comprises:
    providing an electrophoresis bath filled with a first suspension containing charged black matrix pigment particles;
    providing an electrode substrate;
    dipping the base substrate that has experienced the step 1 and the electrode substrate in the first suspension, wherein the black matrix electrodes on the base substrate are disposed oppositely to the electrode substrate; and
    applying a voltage with opposite polarities onto the black matrix electrodes and the electrode substrate, respectively, wherein the voltage applied onto the black matrix electrodes has a polarity opposite to that of charges carried by the black matrix pigment particles, the black matrix pigment particles are deposited on the base substrate in portions corresponding to the black matrix electrodes to form the black matrix layer.

3. The method of manufacturing a color filter according to claim 2, further comprising:
    removing the base substrate and cleaning and curing it after depositing the black matrix pigment particles on the base substrate in portions corresponding to the black matrix electrodes in the step 2.

4. The method of manufacturing a color filter according to claim 2, wherein the black matrix pigment particles are made of acid black 1, acid black 210 or acid black 234 material.

5. The method of manufacturing a color filter according to claim 2, wherein the step 2 further comprises:
    providing an electrophoresis bath filled with a second suspension containing charged first color pigment particles;
    dipping the base substrate that has experienced the step 1 and the electrode substrate in the second suspension, wherein the first electrodes on the base substrate are disposed oppositely to the electrode substrate; and
    applying a voltage with opposite polarities onto the first electrodes and the electrode substrate respectively, wherein the voltage applied onto the first electrodes has a polarity opposite to that of charges carried by the first color pigment particles, the first color pigment particles are deposited on the first electrodes of the base substrate to form the first color filter pattern.

6. The method of manufacturing a color filter according to claim 5, wherein the first color pigment particles are made of acid red or metal complex red material.

7. The method of manufacturing a color filter according to claim 5, further comprising:
    removing the base substrate and cleaning and curing it after depositing the first color pigment particles on the first electrodes of the base substrate in the step 2.

8. The method of manufacturing a color filter according to claim 5, wherein the step 2 further comprises:
    providing an electrophoresis bath filled with a third suspension containing charged second color pigment particles;
    dipping the base substrate that has experienced the step 1 and the electrode substrate in the third suspension, wherein the second electrodes on the base substrate are disposed oppositely to the electrode substrate; and applying a voltage with opposite polarities onto the second electrodes and the electrode substrate respectively, wherein the voltage applied onto the second electrodes has a polarity opposite to that of the charges carried by the second color pigment particles, the second color pigment particles are deposited on the second electrodes of the base substrate to form the second color filter pattern.

9. The method of manufacturing a color filter according to claim 8, wherein the second color pigment particles are made of metal complex green material.

10. The method of manufacturing a color filter according to claim 8, further comprising:
removing the base substrate and cleaning and curing it after depositing the second color pigment particles on the second electrodes of the base substrate in the step 2.

11. The method of manufacturing a color filter according to claim 8, wherein the step 2 further comprises:
providing an electrophoresis bath filled with a fourth suspension containing charged third color pigment particles;
dipping the base substrate that has experienced the step 1 and the electrode substrate in the fourth suspension, wherein the third electrodes on the base substrate are disposed oppositely to the electrode substrate; and
applying a voltage with opposite polarities onto the third electrodes and the electrode substrate respectively, wherein the voltage applied onto the third electrodes has a polarity opposite to that of the charges carried by the third color pigment particles, the third color pigment particles are deposited on the third electrodes of the base substrate to form the third color filter pattern.

12. The method of manufacturing a color filter according to claim 11, wherein the third color pigment particles are made of metal complex blue material.

13. The method of manufacturing a color filter according to claim 11, further comprising: removing the base substrate and cleaning and curing it after depositing the third color pigment particles on the third electrodes of the base substrate in the step 2.

14. A color filter manufactured by the method of claim 1, wherein
the first color filter pattern is formed on the base substrate in portions corresponding to the first electrodes;
the second color filter pattern is formed on the base substrate in portions corresponding to the second electrodes; and
the third color filter pattern is formed on the base substrate in portions corresponding to the third electrodes.

15. The color filter according to claim 14, wherein
the first color filter pattern is formed on a side of the first electrodes facing away from the insulating layer and corresponds to the locations of the first electrodes;
the second color filter pattern is formed on a side of the second electrodes facing away from the insulating layer and corresponds to the locations of the second electrodes; and
the third color filter pattern is formed on a side of the third electrodes facing away from the insulating layer and corresponds to the locations of the third electrodes.

16. A display device, comprising the color filter according to claim 14.

* * * * *